United States Patent [19]
Kaduk et al.

[11] Patent Number: 5,741,855
[45] Date of Patent: Apr. 21, 1998

[54] COMPATIBILIZED FLUOROPLASTIC BLENDS

[75] Inventors: Bruce Kaduk, Mountain View; Keith Dawes, San Mateo; Awtar Singh, Milpitas; Jing Tian, San Mateo, all of Calif.

[73] Assignee: Raychem Corporation, Menlo Park, Calif.

[21] Appl. No.: 660,998

[22] Filed: Jun. 10, 1996

[51] Int. Cl.$^6$ .................. C08L 27/12; C08L 27/16; C08L 27/18
[52] U.S. Cl. .................. 525/88; 525/199; 522/109; 522/156
[58] Field of Search .................. 525/88, 199; 522/109, 522/156

[56] References Cited

U.S. PATENT DOCUMENTS

| | | | |
|---|---|---|---|
| 3,484,503 | 12/1969 | Magner et al. | 260/900 |
| 3,864,228 | 2/1975 | Rossetti, Jr. | 204/159.2 |
| 3,987,126 | 10/1976 | Brodoway | 260/884 |
| 4,001,351 | 1/1977 | Roura | 260/900 |
| 4,094,949 | 6/1978 | Yokokawa et al. | 264/234 |
| 4,115,481 | 9/1978 | Finlay et al. | 260/900 |
| 4,200,568 | 4/1980 | Trautvetter et al. | 260/42.47 |
| 4,322,511 | 3/1982 | Matsuda et al. | 525/344 |
| 4,505,982 | 3/1985 | Hoheisel | 428/421 |
| 4,530,970 | 7/1985 | Morozumi et al. | 525/193 |
| 4,749,752 | 6/1988 | Youlu et al. | 525/199 |
| 4,792,117 | 12/1988 | Kubota | 251/315 |
| 4,844,982 | 7/1989 | Glaister | 428/421 |
| 4,859,836 | 8/1989 | Lunk et al. | 219/548 |
| 4,935,467 | 6/1990 | Cheng et al. | 525/199 |
| 4,960,624 | 10/1990 | Ueno | 428/35.1 |
| 5,041,500 | 8/1991 | Ishiware et al. | 525/200 |
| 5,057,345 | 10/1991 | Barrett | 428/35.1 |
| 5,109,071 | 4/1992 | Johnson et al. | 525/199 |
| 5,143,761 | 9/1992 | Chiotis et al. | 428/35.1 |
| 5,179,167 | 1/1993 | Isiwari et al. | 525/200 |
| 5,317,061 | 5/1994 | Chu et al. | 525/200 |

FOREIGN PATENT DOCUMENTS

| | | |
|---|---|---|
| 0105433 | 4/1984 | European Pat. Off. . |
| 0168020 A2 | 1/1985 | European Pat. Off. . |
| 0132834 | 2/1985 | European Pat. Off. . |
| 0225792 A2 | 6/1987 | European Pat. Off. . |
| 0458195 A2 | 11/1991 | European Pat. Off. . |
| 0524700 A1 | 1/1993 | European Pat. Off. . |
| 60-023701 | 6/1985 | Japan . |
| 6-25500 | 2/1994 | Japan . |

OTHER PUBLICATIONS

Chem. Abs. vol. 120, No. 26, abstract No. 325555 (abstract of JP 6–25500).
Research Disclosure No. 19002 (Feb. 1980).

*Primary Examiner*—David Buttner
*Attorney, Agent, or Firm*—Herbert G. Burkard; Yuan Chao

[57] ABSTRACT

A composition comprises a blend of (a) a first crystalline fluoroplastic which is an ethylene-tetrafluoroethylene copolymer, in an amount between 30 and 70 weight %; (b) a second crystalline fluoroplastic which is a terpolymer of tetrafluoroethylene, hexafluoropropylene, and vinylidene fluoride, in an amount between 30 and 65 weight %; and (c) a fluorinated thermoplastic elastomer which is a block copolymer having at least one elastomeric segment comprising tetrafluoroethylene, vinylidene fluoride, and hexafluoropropylene repeat units in a mole ratio 45–90:5–50:0–35 and at least one nonelastomeric segment comprising tetrafluoroethylene and ethylene repeat units, in an amount between 5 and 25 weight %. The fluorinated thermoplastic elastomer acts as a compatibilizer for the two fluoroplastics. The composition exhibits improved flexibility, tensile strength, and/or elongation.

6 Claims, No Drawings

COMPATIBILIZED FLUOROPLASTIC BLENDS

TECHNICAL FIELD OF THE INVENTION

This invention relates to a compatibilized blend of fluoroplastics.

BACKGROUND OF THE INVENTION

Blending of two or more polymers is a common practice, the objective being to produce a composition having improved mechanical, rheological, and/or degradative properties compared to the individual polymers. It can be an effective way to customize a composition, providing properties which may not be available in a single known polymer or which would require the time-consuming and expensive development of a new polymer.

A virtually infinite number of polymer blends is theoretically possible, but not all polymer blends result in compositions with desirable properties. If the component polymers are incompatible, the resulting blend often has inferior properties. This is especially the case for blends involving fluoropolymers. Normally, incompatibility is the rule, and compatibility is the exception. A rigorous and technically precise definition of a compatible blend is a blend in which the constituents are capable of forming a single phase mixture, at least in the amorphous phase, if not the crystalline phase as well. However, at a practical level a compatible blend is often defined as one which displays useful properties. In this application, this latter definition of compatibility will be used.

Miscibility (compatibility) in blends of two different polymers is generally limited to instances involving amorphous polymers and even such instances are rare. Where blends of two different semicrystalline polymers are involved, instances of miscibility are even rarer. Compatibilizers, which are usually block or graft copolymers having segments in common with the main polymer components of the two polymers being blended, can be used to improve the chances of obtaining a compatible blend. But even the use of a compatibilizer does not assure success and most examples of successful use of compatibilizers involve polyolefin blends. We are not aware of any compatibilized blends involving two fluoroplastics.

Fluoroplastics are unique among polymers, offering performance characteristics unobtainable with most other polymers. Commercially available fluoropolymers include polytetrafluoroethylene (PTFE), fluorinated ethylene-propylene copolymer (FEP), perfluoroalkoxy resin (PFA), polychlorotrifluoroethylene (PCTFE), ethylene-chlorotrifluoroethylene copolymer (ECTFE), ethylene-tetrafluoroethylene copolymer (ETFE), polyvinylidene fluoride (PVDF), and polyvinylfluoride (PVF). Some fluoroplastics such as PTFE are completely fluorinated, while others such as ETFE or PVDF are only partially fluorinated. Typically, fluoroplastics are characterized by high melting points and low glass transition temperatures, enabling them to be advantageously used over a wide temperature range, such as from well below 0° C. to +260° C. Other desirable properties of fluoro plastics include their excellent solvent resistance, electrical insulative properties, low coefficient of friction, low flammability, low gas permeability, and high inertness and stability. The selection of commercially available fluoroplastics is much more limited than for non-fluorinated polymers, because options regarding both the choice of fluorinated monomer and type of polymerization chemistry are much more limited. Thus, it is desirable to develop novel blends of fluoroplastics having improved properties.

SUMMARY OF THE INVENTION

We disclose here our discovery of a blend of two fluoroplastics and a thermoplastic fluoroelastomer as compatibilizer, which blend unexpectedly has improved flexibility, tensile strength, and/or elongation compared to corresponding blend without the compatibilizer. Accordingly, this invention provides a composition comprising:

(a) a first crystalline fluoroplastic which is an ethylene-tetrafluoroethylene copolymer, in an amount between 10 and 90 weight %;

(b) a second crystalline fluoroplastic which is a terpolymer of tetrafluoroethylene, hexafluoropropylene, and vinylidene fluoride, in an amount between 20 and 75 weight %; and (c) a thermoplastic fluoroelastomer which is a block copolymer comprising at least one elastomeric segment comprising tetrafluoroethylene, vinylidene fluoride, and hexafluoropropylene repeat units in a mole ratio 45–90:5–50:0–35 and at least one nonelastomeric segment comprising tetrafluoroethylene and ethylene repeat units, in an amount between 5 and 25 weight %; the weight %'s being based on the combined weights of the first and second crystalline fluoroplastics and the thermoplastic fluoroelastomer.

DESCRIPTION OF THE PREFERRED EMBODIMENTS

The first crystalline fluoroplastic is an ethylene-tetrafluorethylene copolymer, in an amount of between 10 and 90, preferably between 20 and 80, and more preferably between 30 and 70, weight %.

As used herein, "ethylene-tetrafluoroethylene copolymer" means a crystalline thermoplastic polymer (i.e., a fluoroplastic) which is a copolymer of ethylene, tetrafluoroethylene and optionally a third monomer. Ethylene-tetrafluoroethylene copolymer is also known in the art as ETFE or poly(ethylene-tetrafluoroethylene), and herein the acronym ETFE may be used synonymously for convenience. The mole ratio of ethylene to tetrafluoroethylene can be about 35–60:65–40. A third monomer can be present in an amount such that the mole ratio of ethylene to tetrafluoroethylene to third monomer is about 40–60:15–50:0–35. Preferably the third monomer, if present, is so in an amount of about 5 to about 30 mole %. The third monomer can be, for example hexafluoropropylene; 3,3,3-trifluoropropylene-1; 2-trifluoromethyl-3,3,3-trifluoropropylene-1; or perfluoro (alkyl vinyl ether). The melting point of ETFE varies depending on the mole ratio of ethylene and tetrafluoroethylene and the presence or not of a third monomer. Commercially available ETFE's have melting points between 220° and 270° C. Preferably, ETFE used in the invention has a crystallinity on the order of 50%.

ETFE suitable for use in this invention is available from a number of suppliers, including from Du Pont under the tradename Tefzel (e.g., grades 200, 280, 2055, 2127, 2181 and 2129) and from Daikin Industries under the tradename Neoflon (e.g., grades 541, 610 and 620).

The second crystalline fluoroplastic is a terpolymer of tetrafluoroethylene, hexafluoropropylene, and vinylidene fluoride and is used in an amount of between 20 and 75, preferably 25 and 70, more preferably 35 and 65, weight %. It has substantial crystallinity associated with the tetrafluoroethylene repeat units.

A suitable second crystalline fluoroplastic is available commercially under the tradename THV (for example grades THV 200, THV 400, and THV 500, especially the first one) from Minnesota Mining and Mfg. The monomer ratio affects mechanical properties and the melting temperature. THV 200 terpolymer has a peak melting temperature ($T_m$) of 119° C., a crystallinity level of about 26%, and a glass transition temperature ($T_g$) of 5° C. THV 500 terpolymer has a $T_m$ of 165° C., a crystallinity level of about 29%, and a $T_g$ of 26° C. Generally, an increase in the tetrafluoroethylene in the monomer mix leads to an increase in $T_m$ and $T_g$.

The thermoplastic fluoroelastomer, which acts as a compatibilizer between the first and second crystalline fluoroplastics, has elastomeric (soft) and non-elastomeric (hard) segments (or blocks). The elastomeric segment comprises tetrafluoroethylene, vinylidene fluoride, and hexafluoropropylene repeat units with preferred relative weight ratios of about 20–40:40–60:10–30, respectively. The nonelastomeric segment comprises substantially alternating tetrafluoroethylene and ethylene repeat units. A preferred weight ratio of elastomeric to nonelastomeric segments of between about 70–95:30–5. The elastomeric segment preferably has a molecular weight of from about 10,000 to about 10,000,000. The nonelastomeric segment preferably has a molecular weight of from about 1,000 to about 1,000,000, more preferably from about 5,000 to about 500,000. The thermoplastic fluoroelastomer is present in an amount between 5 and 25, preferably between 5 and 12, weight %.

A preferred thermoplastic fluoroelastomer is available under the tradename Daiel T-530 from Daikin (Japan).

Compatiblilized blends of this invention exhibit unexpectedly improved properties in the form of increased flexibility (as measured by secant modulus (2%)), tensile strength, and/or elongation. Improvements are especially noticeable in the flexibility. The blends of this invention may be crosslinked, for example with electron beam or gamma radiation.

Without being bound by theory, we believe that the fluoroelastomer is effective as a compatibilizer because its ethylene-tetrafluoroethylene hard block is compatible with the first crystalline fluoroplastic (an ethylene-tetrafluoroethylne copolymer) while its tetrafluoroethylene-hexafluoropropylene-vinylidene fluoride soft block is compatible with the second crystalline fluoroplastic (tetrafluoroethylene-hexafluoropropylene-vinylidene fluoride terpolymer). Thus, it is likely the fluoroelastomer lowers the interfacial tension between the phases of the first and second crystalline fluoroplastic, thereby promoting interfacial adhesion and a higher level of dispersion during mixing.

Blends of this invention may contain additives commonly used in polymer formulations, such as radiation crosslinking promoters (or prorad), antioxidants, UV stabilizers, and pigments, in typical amounts.

The efficiency of radiation crosslinking may be increased by adding an effective amount of a prorad in intimate mixture with the polymeric components. Generally, a prorad is a compound having at least two ethylenic double bonds, present as allyl, methallyl, propargyl, acrylyl, or vinyl groups. Examples of suitable prorads include triallyl cyanurate (TAC), triallyl isocyanurate (TAIC), triallyl trimellitate, triallyl trimesate, tetraallyl pyromellitate, the diallyl ester of 1,1,3-trimethyl-5-carboxy-3-(p-carboxyphenyl)indane, diallyl adipate, diallyl phthalate (DAP), diallyl isophthalate, diallyl terephthalate, 1,4-butylene glycol dimethacrylate, trimethylolpropane trimethacrylate (TMPTM), pentaerythritol trimethacrylate, glycerol propoxy trimethacrylate, liquid poly(1,2-butadiene), tri-(2-acryloxyethyl)isocyanurate, and tri-(2-methacryloxyethyl)isocyanurate, and the like, and combinations thereof. Preferred crosslinking agents are TAIC, TAC, and TMPTM. Other crosslinking agents which can be used are disclosed in U.S. Pat. Nos. 3,763,222; 3,840,619; 3,894,118; 3,911,192; 3,970,770; 3,985,716; 3,995,091; 4,031,167; 4,155,823; and 4,353,961, the disclosures of which are incorporated herein by reference. Mixtures of crosslinking promoters can be used. Preferably, the radiation crosslinking promoter is used in an amount of between 0.1% and 10%, more preferably between 1% and 5%, percent by weight based on the weight of the composition.

An effective amount of an antioxidant (which can be a single compound or a combination of two or more compounds) may be added to increase thermal stability, forming an intimate mixture or blend with the polymers. Suitable antioxidants include alkylated phenols, e.g. those commercially available as Goodrite 3125™, Irganox B225™ Irganox 1010™ (pentaerythrityl tetrakis-3-(3,5-di-tert-butyl-4-hydroxyphenyl)propionate, Irganox 1035™, Irganox 1076™ (octadecyl 3-(3,5-di-tert-butyl-4-hydroxyphenyl)propionate), Irganox 3114™ (1,3,5-tris-(3, 5-di-tert-butyl-4-hydroxybenzyl)isocyanurate), Topanol CA™ (1,1,3-tris-(5-tert-butyl-4-hydroxy-2-methylphenyl) butane), Irganox 1093™, and Vulkanox BKF™; organic phosphite or phosphates, e.g. dilauryl phosphite and Mark 1178™; alkylidene polyphenols, e.g. Ethanox 330™ (1,3, 5-tris-(3,5-di-tert-butyl-4-hydro-xybenzyl)mesitylene); thio-bis-alkylated phenols, e.g. Santonox R™ (4,4'-thiobis-(3-methyl-6-tert-butylphenol) and polymerized derivatives thereof; dilauryl thio-dipropionate, e.g. Carstab DLTDP™ dimyristyl thiodipropionate, e.g. Carstab DMTDP; distearyl thiodipropionate (DSTDP), e.g. Cyanox STDP; amines, e.g. Wingstay 29, and the like. Combinations of antioxidants can be used. Preferably, the antioxidant is used in an amount of between 0.1% and 5%, more preferably between 0.2% and 2%, percent by weight based on the weight of the composition.

Other additives which can be added include: UV stabilizers such as [2,2'-thio-bis(4-t-octylphenolato)]n-butylamine nickel, Cyasorb UV 1084, 3,5-di-t-butyl-p-hydroxybenzoic acid, UV Chek AM-240; conductive fillers such as carbon black for imparting electrical conductivity; zinc oxide as an acid acceptor or scavenger; and pigments such as titanium dioxide and carbon black.

To measure tensile strength and elongation, the procedure of ASTM D638-94b was generally followed and is summarized as follows: an Instron Model 5567 tensile tester driven by Merlin/Series IX software was set up with a 225 lb Tension Load Cell. The jaw separation was 50.8 mm (2 in). The crosshead speed was 2.0 in/min. These adjustments were made using Windows-based Merlin Series IX software. The extension return limit was set at 763 mm. Test specimens were cut from slabs 0.020 to 0.030 inch thick with a dumbbell-shaped D-die per ASTM specifications with a reduced section dimension of 0.125 inch. The Instron tester was calibrated using the built-in calibration capability. Measurements were done at ambient (room) temperature (20°–25° C.). Each test specimen was measured for width and thickness before analysis, using a micrometer. Two bench marks were marked on each specimen with a 1.0 inch (25.4 mm) separation, centered on the reduced section, in order to measure elongation. The specimens were stretched until break at a crosshead speed of 2 in/min. The elongation between the benchmarks was measured with a video extensometer. The tensile strength, elongation and secant modulus were all recorded automatically using the Merlin software.

"Elongation" means the elongation at break, also referred to as the ultimate elongation. Similarly, "tensile strength" means the tensile strength at break, also referred to as the ultimate tensile strength, and is calculated by dividing the tension at break by the initial cross-sectional area. Secant modulus (2%) was calculated as follows: the load at 2% strain was determined. This load was divided by the original cross-sectional area to obtain the tensile stress, in pounds/square inch (psi). The tensile stress was then divided by 0.02 inch/inch to derive the secant modulus (2%).

The compatibilized blends of this invention may be used in products in which fluoroplastics normally are used, and are especially suitable for wire and cable insulation, heat-recoverable articles, and other applications where fluoropolymers having superior flexibility, elongation, and tensile strength are desirable.

The practice of our invention may be understood by reference to the following examples, which are provided by means of illustration and not limitation.

EXAMPLE 1

In this example, the first fluoroplastic was Tefzel 2129 ETFE from Du Pont ($T_m$ 230° C.), the second fluoroplastic was THV 200 from 3M, and the fluoroelastomer compatibilizer was Daiel T-530 from Daikin. Various amounts of the fluoroelastomer compatibilizer and various ratios of the first and second fluoroplastic were used.

Blends were prepared according to the following procedure: the component polymers along with the additive package described following were mixed in a Brabender mixer for 9–11 min at 30 rpm at 275° C. Each sample composition was molded into 25 mil thick slabs. Crosslinked samples were irradiated with electron beam radiation at a total dosage of 15 MR and annealed at 150° C. for 1 hr. For each blend, a control was prepared in which the ratio of the first and second fluoroplastics was kept substantially the same as in the test sample but with the compatibilizer omitted. Each blend contained about 4.35 parts by weight (ppw)(per 95 parts by weight of blend) of an additive package consisting of 0.10 ppw DSTDP antioxidant, 0.25 ppw Irganox 1010 antioxidant, 0.5 ppw Kadox 15 zinc oxide, and 3.50 ppw TAIC prorad.

Tables IA and IB give formulation and mechanical properties (uncrosslinked and crosslinked), respectively, of compositions where the amount of compatibilizer was kept at about 5% while the ratio of the first and second fluoroplastics was varied. Table IB also includes, for reference purposes, the mechanical properties of the first and second fluoroplastics alone. Each set of data is paired with a corresponding control in which the compatibilizer is omitted while the ratio of first and second fluoroplastics is kept constant.

TABLE I-A

COMPOSITION OF COMPATIBILIZED BLENDS: TEFZEL 2129/THV 200/DAIEL T-530 APPROXIMATELY 5 WT % COMPATIBILIZER

| Experiment No. | Tefzel 2129 (wt. %)[a] | THV 200 (wt %)[a] | Daiel T-530 (wt %)[a] | Ratio 1st/2nd Fluoroplastic |
|---|---|---|---|---|
| 1 (control) | 79.09 | 20.91 | — | 3.78 |
| 1 | 74.96 | 19.81 | 5.23 | 3.78 |
| 2 (control) | 58.18 | 41.82 | — | 1.39 |
| 2 | 55.14 | 39.63 | 5.23 | 1.39 |
| 3 (control) | 20.91 | 79.09 | — | 0.26 |
| 3 | 19.81 | 74.96 | 5.23 | 0.26 |
| 4 (control) | 50.01 | 49.99 | — | 1.00 |
| 4 | 50.86 | 43.91 | 5.23 | 1.15 |

[a]Weight %'s based on combined weights of 1st and 2nd fluoroplastic and compatibilizer

TABLE I-B

MECHANICAL PROPERTIES OF COMPATIBILIZED BLENDS: TEFZEL 2129/THV 200/DAIEL T-530 APPROXIMATELY 5 WT % COMPATIBILIZER.

| | Unbeamed (Uncrosslinked) | | | Beamed (Crosslinked)[a] | | |
|---|---|---|---|---|---|---|
| Experiment No. | Secant Modulus, 2%(psi)[b] | Tensile Strength (psi)[b] | Elongation (%)[b] | Secant Modulus, 2%(psi)[b] | Tensile Strength (psi)[b] | Elongation (%)[b] |
| Tefzel 2129[c] | 66,160 | 5,360 | 400 | 77,990 | 5,160 | 160 |
| THV 200[c] | 9,200 | 3,380 | 690 | 30,300 | 3,780 | 220 |
| 1 (Control) | 51,080 | 4,890 | 410 | 68,990 | 5,120 | 210 |
| 1 | 43,570 | 4,940 | 420 | 62,320 | 4,710 | 190 |
| 2 (control) | 35,970 | 2,330 | 310 | 52,690 | 4,260 | 220 |
| 2 | 26,490 | 3,850 | 440 | 39,200 | 3,700 | 200 |
| 3 (control) | 10,350 | 1,460 | 470 | 24,140 | 2,950 | 210 |
| 3 | 9,270 | 2,620 | 480 | 26,090 | 3,160 | 190 |
| 4 (control) | 27,900 | 1,600 | 220 | 45,960 | 4,050 | 210 |
| 4 | 31,360 | 4,160 | 440 | 40,720 | 4,120 | 200 |

[a]Beamed with 15 Mrad electron beam radiation and then annealed at 150° C. for 1 hr.
[b]Reported values are averages of 5 measurements, unless noted otherwise
[c]Average of 2 sets of 5 measurements The data for compositions in which the amount of compatibilizer was kept at about 10 wt. % while the ratio of first and second crystalline fluoroplastics was varied are presented in Tables II-A and II-B, which are organized in the same manner as the preceding Tables I-A and I-B.

TABLE II-A

COMPOSITION OF COMPATIBILIZED BLENDS: TEFZEL 2129/THV 200/DAIEL T-530 APPROXIMATELY 10 WT % COMPATIBILIZER

| Experiment No. | Tefzel 2129 (wt. %)[a] | THV 200 (wt %)[a] | Daiel T-530 (wt %)[a] | Ratio 1st/2nd Fluoroplastic |
|---|---|---|---|---|
| 1 (control) | 79.09 | 20.91 | — | 3.78 |
| 1 | 70.82 | 18.72 | 10.45 | 3.78 |
| 2 (control) | 58.18 | 41.82 | — | 1.39 |
| 2 | 52.10 | 37.45 | 10.45 | 1.39 |
| 3 (control) | 20.91 | 79.09 | — | 0.26 |
| 3 | 18.73 | 70.81 | 10.45 | 0.26 |
| 4 (control) | 50.01 | 49.99 | — | 1.00 |
| 4 | 45.64 | 43.91 | 10.45 | 1.03 |

[a]Weight %'s based on combined weights of 1st and 2nd fluoroplastic and compatibilizer

TABLE II-B

MECHANICAL PROPERTIES OF COMPATIBILIZED BLENDS: TEFZEL 2129/THV 200/DAIEL T-530 APPROXIMATELY 10 WT % COMPATIBILIZER

| Experiment No. | Unbeamed (Uncrosslinked) | | | Beamed (Crosslinked)[a] | | |
|---|---|---|---|---|---|---|
| | Secant Modulus, 2%(psi)[b] | Tensile Strength (psi)[b] | Elongation (%)[b] | Secant Modulus, 2%(psi)[b] | Tensile Strength (psi)[b] | Elongation (%)[b] |
| Tefzel 2129[c] | 66,160 | 5,360 | 400 | 77,990 | 5,160 | 160 |
| THV 200[c] | 9,200 | 3,380 | 690 | 30,300 | 3,780 | 220 |
| 1 (Control) | 43,670 | 4,060 | 390 | 66,920 | 4,580 | 190 |
| 1 | 43,850 | 5,000 | 440 | 51,710 | 4,380 | 200 |
| 2 (control) | 31,710 | 1,420 | 110 | 56,060 | 3,930 | 190 |
| 2 | 21,580 | 3,260 | 440 | 35,640 | 3,450 | 180 |
| 3 (control) | 12,360 | 1,590 | 510 | 27,670 | 2,940 | 190 |
| 3 | 8,370 | 2,850 | 540 | 19,980 | 3,400 | 220 |
| 4 (control) | 27,900 | 1,600 | 220 | 45,960 | 4,050 | 210 |
| 4 | 24,620 | 3,920 | 430 | 35,650 | 3,570 | 190 |

[a] Beamed with 15 Mrad electron beam radiation and then annealed at 150° C. for 1 hr.
[b] Reported values are averages of 5 measurements, unless noted otherwise
[c] Average of 2 sets of 5 measurements The data for compositions in which the amount of compatibilizer was kept at about 20 wt. % while the ratio of first and second crystalline fluoroplastics was varied are presented in Tables III-A and III-B, which are organized in the same manner as the preceding tables.

TABLE III-A

COMPOSITION OF COMPATIBILIZED BLENDS: TEFZEL 2129/THV 200/DAIEL T-530 APPROXIMATELY 20 WT % COMPATIBILIZER

| Experiment No. | Tefzel 2129 (wt. %)[a] | THV 200 (wt %)[a] | Daiel T-530 (wt %)[a] | Ratio 1st/2nd Fluoroplastic |
|---|---|---|---|---|
| 1 (control) | 79.09 | 20.91 | — | 3.78 |
| 1 | 62.55 | 16.53 | 20.91 | 3.78 |
| 2 (control) | 58.18 | 41.82 | — | 1.39 |
| 2 | 46.02 | 33.06 | 20.91 | 1.39 |
| 3 (control) | 20.91 | 79.09 | — | 0.26 |
| 3 | 16.51 | 62.57 | 20.91 | 0.26 |

[a] Weight %'s based on combined weights of 1st and 2nd fluoroplastic and compatibilizer

TABLE III-B

MECHANICAL PROPERTIES OF COMPATIBILIZED BLENDS: TEFZEL 2129/THV 200/DAIEL T-530 APPROXIMATELY 20 WT % COMPATIBILIZER

| Experiment No. | Unbeamed (Uncrosslinked) | | | Beamed (Crosslinked)[a] | | |
|---|---|---|---|---|---|---|
| | Secant Modulus, 2%(psi)[b] | Tensile Strength (psi)[b] | Elongation (%)[b] | Secant Modulus, 2%(psi)[b] | Tensile Strength (psi)[b] | Elongation (%)[b] |
| Tefzel 2129[c] | 66,160 | 5,360 | 400 | 77,990 | 5,160 | 160 |
| THV 200[c] | 9,200 | 3,380 | 690 | 30,300 | 3,780 | 220 |
| 1 (Control) | 50,130 | 4,120 | 430 | 73,120 | 4,860 | 190 |
| 1 | 24,870 | 3,940 | 480 | 44,380 | 3,840 | 190 |
| 2 (control) | 31,830 | 2,530 | 350 | 44,680 | 3,610 | 190 |
| 2 | 16,630 | 3,440 | 480 | 27,600 | 3,600 | 200 |
| 3 (control) | 15,660 | 2,120 | 540 | 24,800 | 3,130 | 200 |
| 3 | 5,350 | 2,870 | 560 | 17,860 | 3,110 | 210 |

TABLE III-B-continued

MECHANICAL PROPERTIES OF COMPATIBILIZED BLENDS: TEFZEL 2129/THV 200/DAIEL T-530 APPROXIMATELY 20 WT % COMPATIBILIZER

| Experiment No. | Unbeamed (Uncrosslinked) | | | Beamed (Crosslinked)[a] | | |
|---|---|---|---|---|---|---|
| | Secant Modulus, 2%(psi)[b] | Tensile Strength (psi)[b] | Elongation (%)[b] | Secant Modulus, 2%(psi)[b] | Tensile Strength (psi)[b] | Elongation (%)[b] |

[a] Beamed with 15 Mrad electron beam radiation and then annealed at 150° C. for 1 hr.
[b] Reported values are averages of 5 measurements, unless noted otherwise
[c] Average of 2 sets of 5 measurements

EXAMPLE 2

In this example, the first fluoroplastic was Neoflon EP620 ETFE from Daikin ($T_m$ 225° C.), the second fluoroplastic was THV 200, and the fluoroelastomer compatibilizer was Daiel T-530. The blends were prepared as in Example 1. The data for the instance in which the amount of compatibilizer was about 5 wt. % is presented in Tables IV-A/IV-B, arranged in the same manner as in the preceding tables.

TABLE IV-A

COMPOSITION OF COMPATIBILIZED BLENDS: NEOFLON EP620/THV 200/DAIEL T-530 APPROXIMATELY 5 WT % COMPATIBILIZER

| Experiment No. | Neoflon EP620 (wt. %)[a] | THV 200 (wt %)[a] | Daiel T-530 (wt %)[a] | Ratio 1st/2nd Fluoroplastic |
|---|---|---|---|---|
| 1 (control) | 79.09 | 20.91 | — | 3.78 |
| 1 | 74.96 | 19.81 | 5.23 | 3.78 |
| 2 (control) | 58.18 | 41.82 | — | 1.39 |
| 2 | 55.14 | 39.63 | 5.23 | 1.39 |
| 3 (control) | 20.91 | 79.09 | — | 0.26 |
| 3 | 19.81 | 74.96 | 5.23 | 0.26 |
| 4 (control) | 50.01 | 49.99 | — | 1.00 |
| 4 | 50.86 | 43.91 | 5.23 | 1.15 |

[a] Weight %'s based on combined weights of 1st and 2nd fluoroplastic and compatibilizer

TABLE IV-B

MECHANICAL PROPERTIES OF COMPATIBILIZED BLENDS: NEOFLON EP620/THV 200/DAIEL T-530 APPROXIMATELY 5 WT % COMPATIBILIZER

| Experiment No. | Unbeamed (Uncrosslinked) | | | Beamed (Crosslinked)[a] | | |
|---|---|---|---|---|---|---|
| | Secant Modulus, 2%(psi)[b] | Tensile Strength (psi)[b] | Elongation (%)[b] | Secant Modulus, 2%(psi)[b] | Tensile Strength (psi)[b] | Elongation (%)[b] |
| Neoflon 620[c] | 48,310 | 4,440 | 380 | 88,150 | 4,420 | 130 |
| THV 200[c] | 9,200 | 3,280 | 690 | 30,300 | 3,780 | 220 |
| 1 (Control) | 43,000 | 4,780 | 440 | 56,800 | 4,150 | 190 |
| 1 | 33,800 | 4,660 | 440 | 54,890 | 3,860 | 180 |
| 2 (control) | 28,700 | 2,910 | 410 | 48,210 | 3,810 | 210 |
| 2 | 30,130 | 4,020 | 450 | 48,830 | 3,850 | 200 |
| 3 (control) | 12,760 | 1,770 | 520 | 29,770 | 2,740 | 190 |
| 3 | 8,570 | 2,830 | 520 | 21,680 | 3,320 | 230 |
| 4 (control) | 25,100 | 2,280 | 400 | 45,800 | 4,030 | 200 |
| 4 | 23,320 | 3,770 | 470 | 42,460 | 3,770 | 190 |

[a] Beamed with 15 Mrad electron beam radiation and then annealed at 150° C. for 1 hr.
[b] Reported values are averages of 5 measurements, unless noted otherwise
[c] Average of 2 sets of 5 measurements Data for the instance in which the amount of compatibilizer was about 10 wt % is presented in Tables V-A and V-B.

TABLE V-A

COMPOSITION OF COMPATIBILIZED BLENDS: NEOFLON EP620/THV 200/ DAIEL T-530 APPROXIMATELY 10 WT % COMPATIBILIZER

| Experiment No. | Neoflon EP620 (wt. %)[a] | THV 200 (wt %)[a] | Daiel T-530 (wt %)[a] | Ratio 1st/2nd Fluoroplastic |
|---|---|---|---|---|
| 1 (control) | 50.01 | 49.99 | — | 1.00 |
| 1 | 45.64 | 43.91 | 10.45 | 1.03 |

[a]Weight %'s based on combined weights of 1st and 2nd fluoroplastic and compatibilizer

TABLE V-B

MECHANICAL PROPERTIES OF COMPATIBILIZED BLENDS: NEOFLON EP620/THV 200/ DAIEL T-530 APPROXIMATELY 10 WT % COMPATIBILIZER

| | Unbeamed (Uncrosslinked) | | | Beamed (Crosslinked)[a] | | |
|---|---|---|---|---|---|---|
| Experiment No. | Secant Modulus, 2%(psi)[b] | Tensile Strength (psi)[b] | Elongation (%)[b] | Secant Modulus, 2%(psi)[b] | Tensile Strength (psi)[b] | Elongation (%)[b] |
| Neoflon 620[c] | 48,310 | 4,440 | 380 | 88,150 | 4,420 | 130 |
| THV 200[c] | 9,200 | 3,280 | 690 | 30,300 | 3,780 | 220 |
| 1 (control) | 25,100 | 2,280 | 400 | 45,800 | 4,030 | 200 |
| 1 | 17,550 | 4,000 | 540 | 33,240 | 3,960 | 210 |

[a]Beamed with 15 Mrad electron beam radiation and then annealed at 150° C. for 1 hr.
[b]Reported values are averages of 5 measurements, unless noted otherwise
[c]Average of 2 sets of 5 measurements

EXAMPLE 3

In this example, the first fluoroplastic was Tefzel 2181 ETFE from Du Pont ($T_m$ 265° C.), the second fluoroplastic was THV 200, and the compatibilizer was Daiel T-530. The blends were prepared as in Example 1, except that the Brabender mixing was done at 300° C.), C. The data is provided in Tables VI-A and VI-B, arranged as before.

TABLE VI-A

COMPOSITION OF COMPATIBILIZED BLENDS: TEFZEL 2181/THV 200/DAIEL T-530 APPROXIMATELY 5 WT % COMPATIBILIZER

| Experiment No. | Tefzel 2181 (wt. %)[a] | THV 200 (wt %)[a] | Daiel T-530 (wt %)[a] | Ratio 1st/2nd Fluoroplastic |
|---|---|---|---|---|
| 1 (control) | 79.09 | 20.91 | — | 3.78 |
| 1 | 74.96 | 19.81 | 5.23 | 3.78 |
| 2 (control) | 58.18 | 41.82 | — | 1.39 |
| 2 | 55.14 | 39.63 | 5.23 | 1.39 |
| 3 (control) | 20.91 | 79.09 | — | 0.26 |
| 3 | 19.81 | 74.96 | 5.23 | 0.26 |

[a]Weight %'s based on combined weights of 1st and 2nd fluoroplastic and compatibilizer

TABLE VI-B

MECHANICAL PROPERTIES OF COMPATIBILIZED BLENDS: TEFZEL 2181/THV 200/DAIEL T-530 APPROXIMATELY 5 WT % COMPATIBILIZER

| | Unbeamed (Uncrosslinked) | | | Beamed (Crosslinked)[a] | | |
|---|---|---|---|---|---|---|
| Experiment No. | Secant Modulus, 2%(psi)[b] | Tensile Strength (psi)[b] | Elongation (%)[b] | Secant Modulus, 2%(psi)[b] | Tensile Strength (psi)[b] | Elongation (%)[b] |
| Tefzel 2181[c] | 97,060 | 6,550 | 350 | 118,250 | 6,970 | 140 |
| THV 200[c] | 9,380 | 3,470 | 670 | 33,370 | 3,780 | 220 |
| 1 (Control) | 78,250 | 4,880 | 330 | 87,930 | 6,200 | 190 |
| 1 | 67,450 | 5,210 | 360 | 85,570 | 5,480 | 190 |
| 2 (control)[d] | 45,100 | 1,630 | 50 | 59,620 | 4,040 | 160 |
| 2 | 36,760 | 3,260 | 330 | 58,600 | 4,690 | 200 |
| 3 (control) | 19,230 | 1,730 | 480 | 40,680 | 3,270 | 180 |
| 3 | 13,980 | 2,920 | 450 | 29,390 | 3,490 | 200 |

[a]Beamed with 15 Mrad electron beam radiation and then annealed at 150° C. for 1 hr.
[b]Reported values are averages of 5 measurements, unless noted otherwise
[c]Average of 2 sets of 5 measurements
[d]Average of 2 sets of 5 measurements The above results show that the compatibilized blends of this invention (whether crosslinked or not) generally exhibit an increase in at least one of flexibility (i.e., decreased secant modules (2%)), tensile strength, and/or elongation, without any offsetting decrement in the other mechanical properties. Improvement is especially marked in the flexibility. In some instances, improvement in two or even all three properties are observed.

Further, we have discovered that binary blends of the ETFE as the first crystalline fluoroplastic and a crystalline fluoroplastic such as THV 220 exhibit synergistic improvements in flexibility, tensile strength, and/or elongation, as disclosed in copending, commonly assigned application of Kaduk et al., No. 08/660995, filed Jun. 10, 1996, the disclosure of which is incorporated herein by reference.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various passages may relate to specific embodiments of the invention, it is to be understood that where a specific feature is disclosed in the context of a particular embodiment, such feature can also be used, to the extent appropriate, in the context of another embodiment, in combination with another feature, or in the invention in general.

What is claimed is:

1. A composition comprising a blend of:

(a) a first crystalline fluoroplastic which is an ethylene-tetrafluoroethylene copolymer, in an amount between 30 and 70 weight %;

(b) a second crystalline fluoroplastic which is a terpolymer of tetrafluoroethylene, hexafluoropropylene, and vinylidene fluoride, in an amount between 30 and 65 weight %; and (c) a thermoplastic fluoroelastomer which is a block copolymer comprising at least one elastomeric segment comprising tetrafluoroethylene, vinylidene fluoride, and hexafluoropropylene repeat units in a mole ration 45–90:5–50:0–35 and at least one nonelastomeric segment comprising tetrafluoroethylene and ethylene repeat units, in an amount between 5 and 25 weight %;

the weight %'s being based on the combined weights of the first and second crystalline fluoroplastics and the thermoplastic fluoroelastomer.

2. A composition according to claim 1, wherein the thermoplastic fluoroelastomer is present in an amount of between 5 and 12 weight %.

3. A composition according to claim 1, which has been crosslinked by electron beam radiation.

4. A composition according to claim 3, wherein the thermoplastic fluoroelastomer is present in an amount of between 5 and 12 weight %.

5. A composition according to claim 1, which has been crosslinked by gamma radiation.

6. A composition according to claim 5, wherein the thermoplastic fluoroelastomer is present in an amount of between 5 and 12 weight %.

* * * * *